INVENTOR.
KLAUS G. SCHROEDER

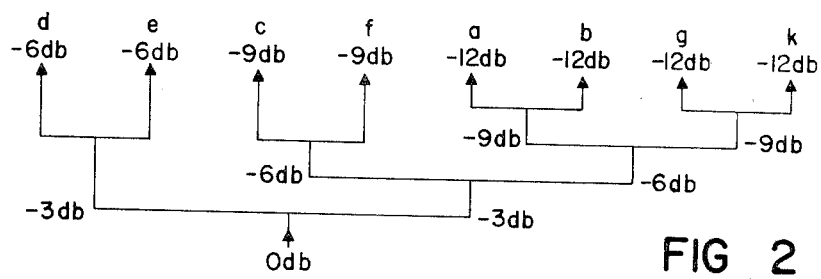
FIG 2
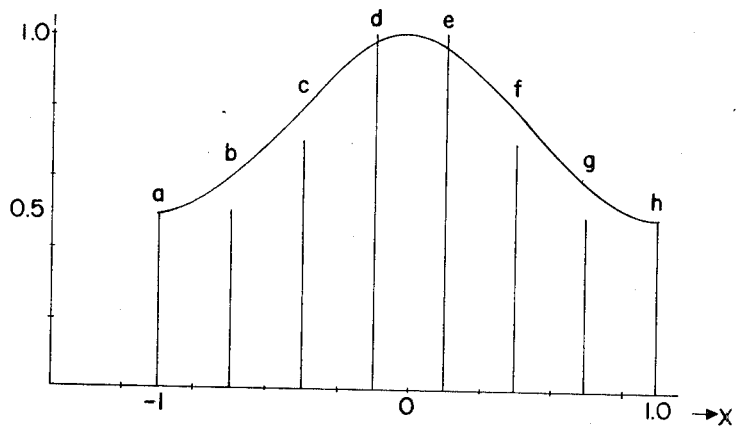
FIG 3  AMPLITUDE TAPER
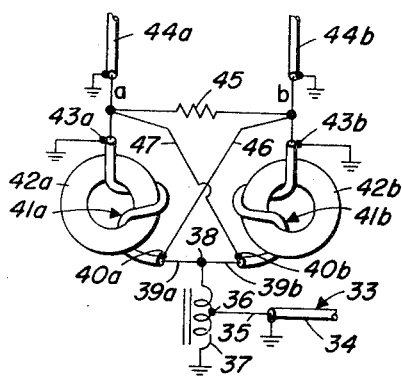
FIG 5
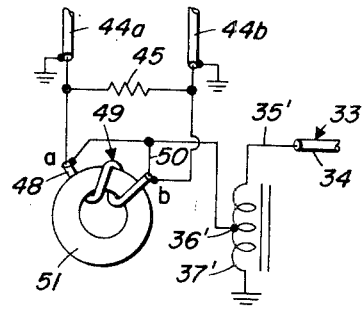
FIG 6

United States Patent Office 3,525,995
Patented Aug. 25, 1970

3,525,995
AMPLITUDE TAPERING, NONSYMMETRICAL
BINARY FEED NETWORKS FOR HIGH-
POWER HF PHASED ARRAYS
Klaus G. Schroeder, Dallas, Tex., assignor to Collins
Radio Company, Cedar Rapids, Iowa, a corporation of
Iowa
Filed Mar. 14, 1967, Ser. No. 623,051
Int. Cl. H01q 13/00, 3/26
U.S. Cl. 343—777                                7 Claims

ABSTRACT OF THE DISCLOSURE

An amplitude tapering nonsymmetrical binary feed network for high-power HF phased array antenna systems of either uniformly or nonuniformly spaced elements with a plurality of power dividers employed on different cascaded power level tiers, and with some signal paths from a single feed network connection through the feed network having more signal power division steps than at least one other signal path through the feed network. A high degree of reflected signal isolation is provided at divided signal connections of dividers with feed networks employing hybrid circuits as the signal dividers.

Figure 1:
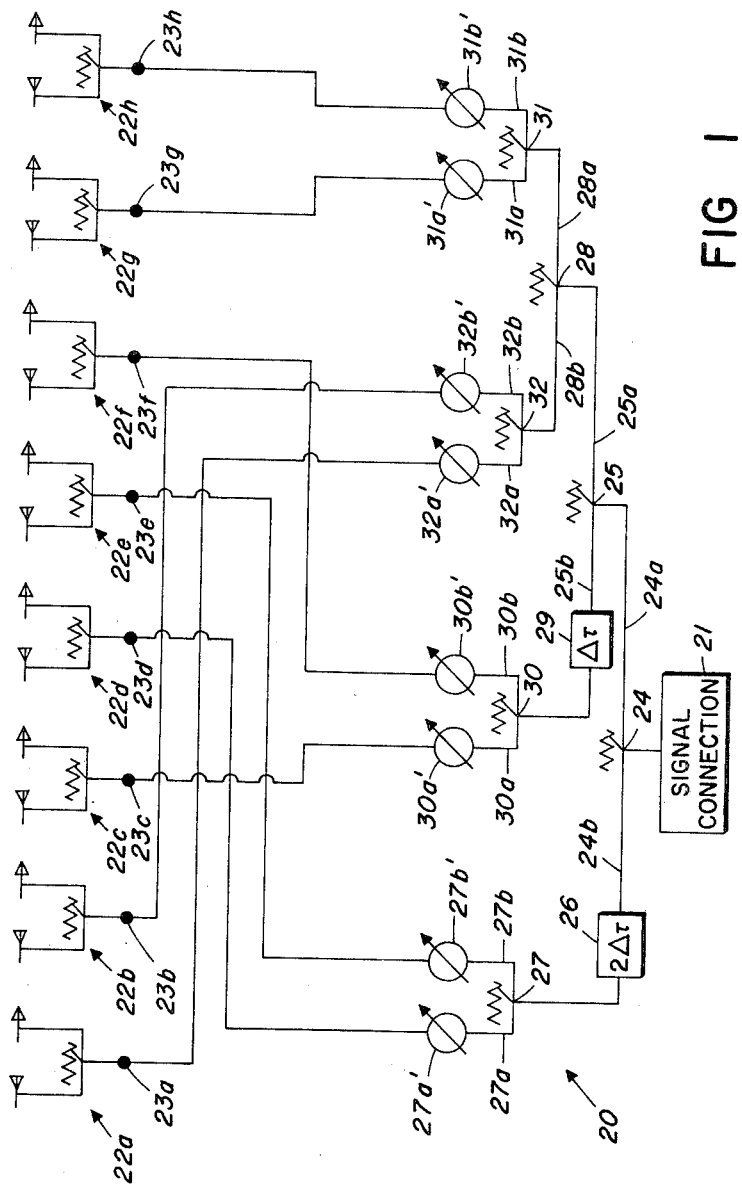

This invention relates in general to antenna phased array systems, and in particular, to antenna high-power HF phased array systems and to amplitude tapering nonsymmetrical binary feed networks for high-power HF phased array antenna systems.

With reference to various existing amplitude taper antenna array feed networks particularly with various such receiving arrays, a sidelobe reducing amplitude taper is relatively easily achieved through the use of attenuators inserted in feed lines leading from the output ports of regular symmetrical corporate feed structures to the antenna array elements. Should an amplifier be used at each element, then both with receiving and transmitting antenna element arrays, the desired amplitude taper may be applied either by varying the gain of the amplifiers, or, in the case of transmitting antenna arrays, by varying the power level at the input to the final amplifiers. If there are fewer transmitters in such a feed structure for a transmitter antenna array than there are elements, an amplitude taper can still be attained, in the same fashion, for minimizing sidelobes in azimuth if the number of transmitters equals the number of array elements disposed horizontally. With this arrangement individual transmitters would be feeding a number of elements in a vertical stack. Should fewer transmitters be available than there are horizontally displaced element positions, then one big transmitter could be employed through use of a conventional technique for achieving amplitude taper required for attaining desired sidelobe levels. Such a conventional technique is to produce an unequal power split by transforming the element impedances by different amounts so that different impedances are connected in parallel at a common junction. With this approach each of the elements then radiates a different amount of power equal to the common junction impedance divided by the impedance to which the element impedance was transformed. Please note that unless broadband transformers are used, this type of amplitude tapering power splitter is narrow-band, and even with broadband transformers (assuming the required impedance transformation can readily be achieved), the fact that there is no isolation between the elements with all being fed from the same common junction, makes the prediction of mutual impedance effects very difficult.

It is, therefore, a principal object of this invention to provide an efficient antenna array feed network with amplitude tapering in high-power phased arrays of uniformly spaced elements, and arrays of nonuniformly spaced elements.

A further object is to provide such antenna arrays and array feed networks with very broadband capabilities, for example with frequency ranges of up to 10:1 as determined by the type of power divider and array elements used.

Features of this invention useful in accomplishing the above objects include, in various embodiments, amplitude tapering in high-power phased arrays of either uniformly or nonuniformly spaced elements. These amplitude-tapering feed networks make use of isolated power dividers, with matched ports, that are employed on different cascaded power level tiers. When, for example, the feed network and antenna array is being used in the transmit mode of operation the RF signal input is to a power divider with one output being connected to and through at least one more power divider before ultimate connection to array elements than the other output thereof. Further, the additional power divider may in turn have one output thereof also connected to and through at least one more power divider before ultimate connection to array elements than the other output thereof and this may be extended through further division steps in cascade fashion. With this nonsymmetrical binary feed network the feed path (or paths if two are equal) of least signal power division is connected to a center array element (or elements as the case may be). Signal power feed paths of progressively more signal power division steps and progressively lower signal power levels are connected to array elements positioned progressively outward from the center array element, or elements, with numerical increase in divider steps and lessened power levels. Further, since there are different phase delays through the different signal paths of these feed networks as determined by the varying number of power division steps between the different signal paths of a feed network, varying degrees of time delay are employed in paths with fewer power division steps. This is with the greatest time delay provided, as by a predetermined transmission line adjustment, for a signal path with the least number of signal power division steps in a feed network.

Specific embodiments representing what are presently regarded as the best modes of carrying out the invention are illustrated in the accompanying drawings.

Figure 4:
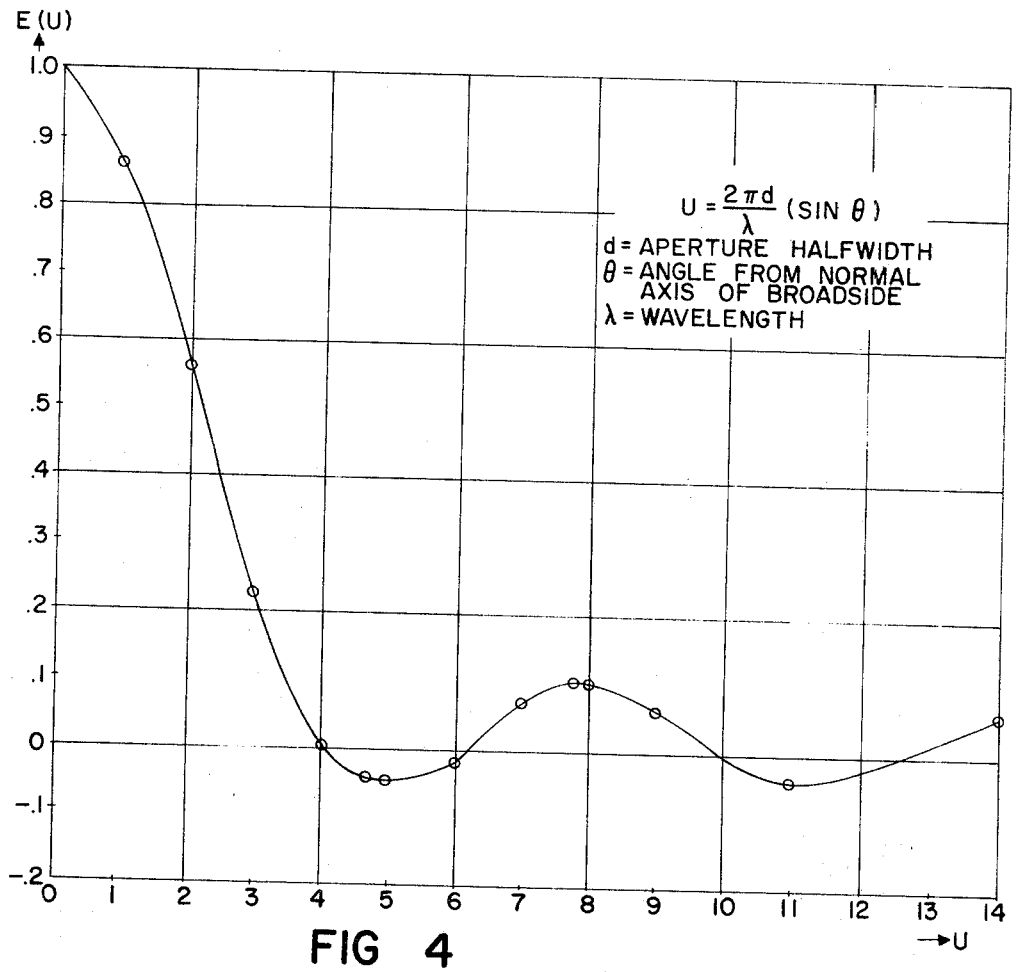
Figure 7:
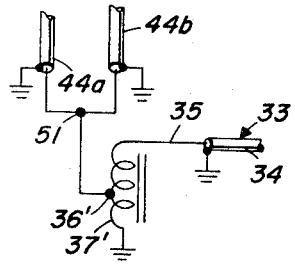
Figure 8A:
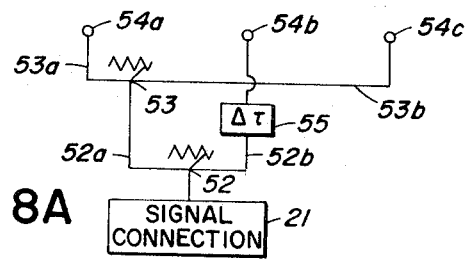
Figure 8B:
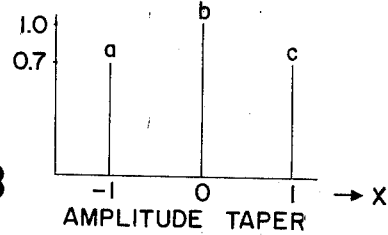
Figure 9A:
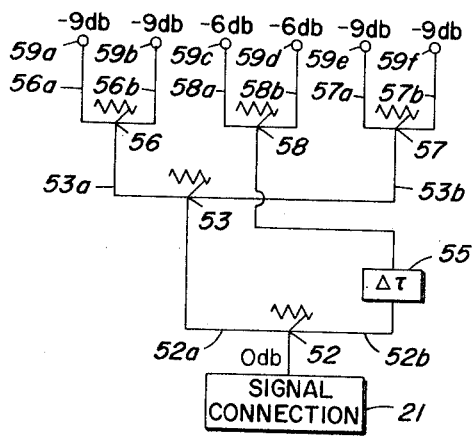
Figure 9B:
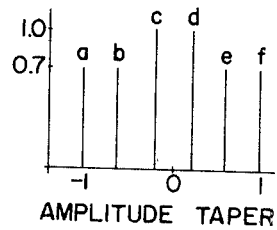
Figure 10:
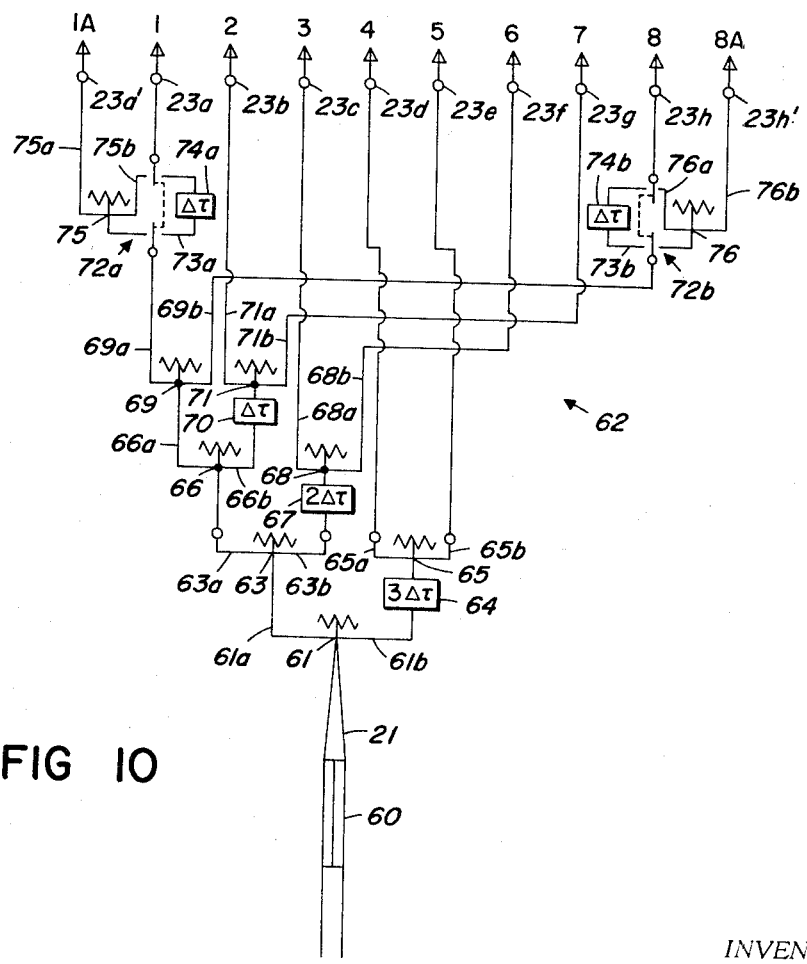

In the drawings:

FIG. 1 represents a schematic of the preferred mode embodiment showing a beam forming and beam steering system for a 16-element horizontal billboard array of eight complementary pair element groups (an eight CPEG array) fed from eight feed connections, respectively;

FIG. 2, a diagram illustrating negative db levels, at various locations in the network of FIG. 1, relative to the signal connection of the feed network and down to the eight connections for the complementary pair element groups;

FIG. 3, a plot of the relative amplitudes at the eight connection points for the eight complementary pair element groups with the strongest signal connection points being at the one level and the others at decimal ratios thereof, and includes a continuous function curve approximating the effect of such an amplitude distribution;

FIG. 4, a normalized far-afield voltage pattern for the eight CPEG array of FIGS. 1 and 2 and with the discrete value amplitude distribution of FIG. 3;

FIG. 5, a detailed showing of a step-up hybrid usable as a divider in the feed network of FIG. 1 and in other embodiments of the invention;

FIG. 6, a detailed showing of a step-down hybrid that may be used as a divider in various embodiments of the invention;

FIG. 7, a third alternate divider, in the form of a T circuit, that may be employed as a divider in various embodiments of the invention;

FIG. 8A, a schematic showing of a relatively simple feed network from a signal connection to feed connection points for three antenna elements of an array, or three CPEG's of an array as the case may be;

FIG. 8B, a graph of the amplitude taper at the three array connection points;

FIG. 9A, a feed network from a signal connection to six antenna array connection points;

FIG. 9B, the amplitude taper graph for the embodiment of FIG. 9A;

FIG. 10, a feed network from a single balun connection point to antenna aray feed points with switching between end elements of the array for varying the effective numerical number of array elements from eight to ten and simultaneously varying the amplitude taper of the outboard elements by approximately 3 db.

Figure 11A:
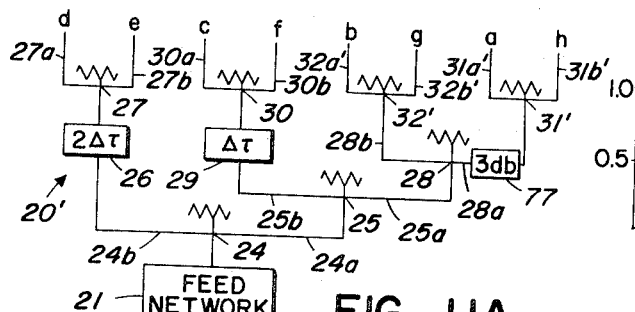
Figure 11B:
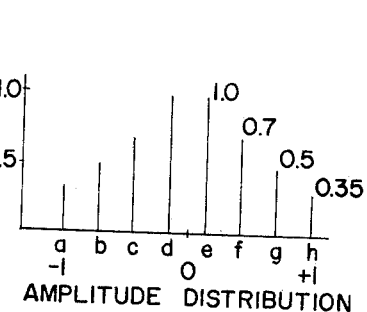
Figure 12A:
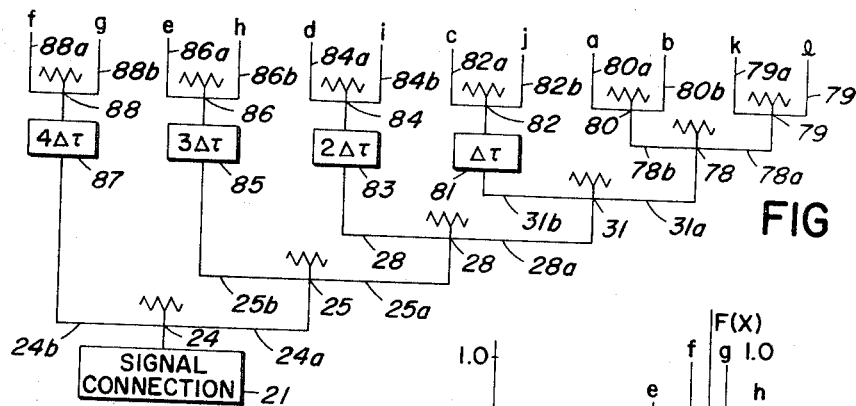
Figure 12B:
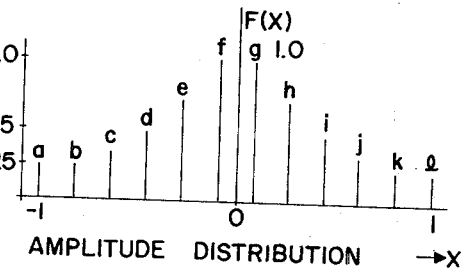
Figure 13A:
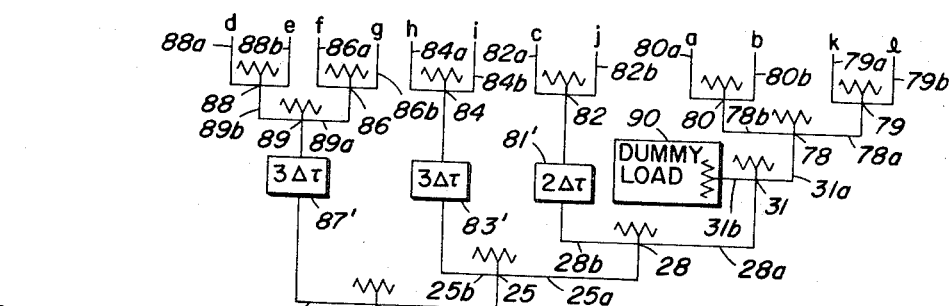
Figure 13B:
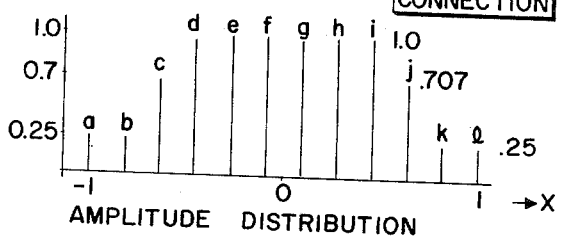

FIG. 11A, a feed network from a signal connection to eight element array connections, also including an attenuator for the lowest db level array connection points of the network;

FIG. 11B, the amplitude taper graph for the embodiment of FIG. 11A;

FIG. 12A, a feed network from a signal connection to twelve antenna array connection points;

FIG. 12B, the amplitude taper graph for the embodiment of FIG 12A;

FIG. 13A, a feed network from a signal connection to twelve antenna connection points and including in the feed network a signal power divider having one side connected to a dummy load; and FIG. 13B, the amplitude taper graph for the embodiment of FIG. 13A.

Referring to the drawings:

The array feed network 20 of FIG. 1 connected between a signal connection 21 and eight antenna array CPEG's 22a through 22h is a network providing amplitude tapering in a high-power phased array of the CPEG's 22a through 22h which may be uniformly or nonuniformly spaced as the case may be. The eight CPEG's 22a through 22h are arranged to present a horizontal billboard array fed from eight feed connection points 23a through 23h that actually could be connected to individual monopoles in such a billboard array in place of the CPEG's shown. The complementary pair element groups (CPEG's) 22a through 22h could be such as disclosed in applicant's copending application Ser. No. 488,541, filed Sept. 20, 1965, isued June 10, 1969, as U.S. Pat No. 3,449,741, and asigned to common assignee. Furthermore, the CPEG's 22a through 22h may each employ a step-up hybrid such as detailed in the circuitry of FIG. 5 and as set forth in applicant's copending application Ser. No. 583,880 filed Oct. 3, 1966, issued Nov. 26, 1968 as U.S. Pat. No. 3,413,574 and also assigned to common assignee.

The signal connection 21 is first to a higher power signal power divider 24 with signal power divider lines 24a and 24b. The signal power divided lines 24a and 24b are connected, respectively, line 24a to an additional signal power divider 25 and line 24b to and through a 2Δτ time delay device 26 to an additional signal power divider 27. The signal power divider 25, quite similar to the power divider 24, is connected through its two signal power divided lines 25a and 25b, respectively, to additional divider 28 and to and through Δτ time delay device 29 to signal power divider 30 of the network. Signal power divider 28 is connected through its signal power divider lines 28a and 28b to further signal power dividers 31 and 32, respectively, in the feed network. The a and b outputs of the signal power dividers 27, 30, 31 and 32, respectively, are connected to and through signal phase adjusting devices, 27a' to array connection point 23d, 27b' to 23e, 30a' to 23c, 30b' to 23f, 32a' to 23a, 32b' to 23b, 31a' to 23g, and 31d' to 23h.

It should be noted that the signal phase adjusting devices such as 27a', 27b', 30a', etc., are provided in this embodiment to give an additional adjustable beam steering characteristic by providing a phase adjustment capability at that point in the feed network. Further, the lines, interconnecting these phase adjusting devices 27a', 27b', etc., and the array connection points 23a through 23h they are connected to, are preferably of equal lengths, although, it is conceivably possible to compensate or adjust for some differences in length through these lines by, and with such adjustment of the respective signal phase adjusting devices 27a', 27b', etc. Please note further that the phase adjustable beam steering devices 27a', 27b', etc., may be removed from the feed network embodiment of FIG. 1. The feed network would then provide with the horizontal billboard array of antenna elements the desired beam forming characteristics nominally oriented along and centered about a center axis perpendicular to the billboard array, and without the additional beam steering capability provided for by such adjustable phase beam steering devices. With these beam steering devices removed, the lines connecting the a and b outputs of the signal power dividers 27, 30, 31 and 32 with the array connection points they are connected to should be of substantially equal effective electrical signal length. Since the hybrid junctions in the feed network have fairly constant time delay over their operational bandwidth, the different phase delays for the three different type signal paths in the feed network that the signal takes, may be compensated at the hybrid center frequencies with sections of transmission line as the Δτ delay device 29 and also as the 2Δτ delay device 26. This is with the transmission line delay device 29 providing delay Δτ equal to the time delay encountered through the divider 28 in the signal path to and through divider 30 and the signals fed to the array connection points 23c and 23d. In like manner, the transmission line time delay device 26 provides a time delay of 2Δτ equalling the time delay through the divider 25 and the divider 28 in the signal path to divider 27 and ultimately to the array connection points 23d and 23e.

Referring now to FIG. 2, db levels are indicated for various locations of the feed network embodiment of FIG. 1 and are shown as being negative db levels as related to the 0 db reference signal level at the signal connection to the feed network and on down to the eight antenna element connection points, actually the eight connection points for the complementary pair element groups in the embodiment of FIG. 1. With reference to this FIG. 2 diagram, the net amplitude taper across the array at the array connection points in the feed network, as shown in FIG. 1, is −6 db, −6 db, −3 db, 0 db, 0 db, −3 db, −6 db, and −6db, and when converted to signal current ratios these are, respectively, 0.5, 0.5, 0.707, 1, 1, 0.707, 0.5, and 0.5. These current ratio values are plotted in accord with, and as a function of, their horizontal spacing along a billboard array to provide the plot for relative element groups as shown in FIG. 3.

A continuous function $F(X)=0.75+0.25$ cosine $\pi X$ is also shown on FIG. 3 drawn approximately through the discrete ratio values of element amplitude plotted, and it might be noted that a pattern based on this continuous function can be calculated. The letters in the circles correspond to the array connection points in the feed network in the same order of their distribution as shown in FIG. 1. It can be seen that the left two, and the right two edge elements of the feed network are fed with the same amplitude in the embodiment of FIG. 1 but from different ports of the feed network. Since all feed network output ports are isolated from each other (provided hybrids are used) this has no substantial affect, adverse or otherwise, on the performance of the array. It is of interest to note that UHF model patterns have been measured using different feed excitation paths to equal signal level ports, and the resulting patterns were found to be identical.

The exact theoretical far-field voltage pattern of an array of eight isotropic sources using the discrete amplitude ratio values of FIG. 3 has also been calculated and found to be in close agreement with the approximated pattern calculated from the continuous illumination function. The normalized far-field voltage pattern for the eight CPEG array of FIGS. 1 and 2 and with the discrete value amplitude ratio distribution of FIG. 3 is shown in FIG. 4. This far-field pattern is such that the second and strongest sidelobe level is −20 db from the beam maxmum. While this is quite advantageous, a further reduction in this level is possible by spacing the elements of the array nonuniformly, that is, by reducing the spacing in the center of the array and increasing the spacing at the edges of the array.

Referring now to FIG. 5, a step-up hybrid is shown that may be quite advantageously employed for the dividers 24, 25, 28, 27, 30, 31 and 32, or as part of the CPEG's 22a through 22h. In this step-up hybrid divider the input, or combined signal, or undivided signal line 33 is shown to be a coaxial input line with the outer sheath 34 connected to ground and with the center coaxial conductor 35 thereof connected to a tap 36 of a coil 37 connected between ground and a common sum port 38 junction of coaxial line center conductors 39a and 39b at sum port 38 of the step-up hybrid circuit. The outer conductors 40a and 40b forming the outer conductive sheaths of the coaxial lines 41a and 41b at this point form the balanced difference port of the step-up hybrid circuit, and with the two coaxial lines 41a and 41b being wound as substantially equal transformer windings between the outer sheaths and the inner conductors thereof on ferrite toroid core structures 42a and 42b, respectively. At other ends of the coaxial lines 41a and 41b, opposite from the sum port and balanced difference port ends, the outer coaxial line sheath ends 43a and 43b are connected to ground. The inner conductors at this end are connected to the divided a and b center conductors of the a and b divided coaxial lines 44a and 44b, respectively. The junctions of inner conductors of coaxial lines 44a and 44b with the respective coaxial lines 41a and 41b are interconnected through impedance means (resistor 45), and also through lines 46 and 47, respectively, across to the opposite side terminals of the balanced difference port.

In FIG. 6 a step-down hybrid is shown that may be employed in place of the step-up hybrid of FIG. 5 for the dividers of the FIG. 1 embodiment and other embodiments of the invention. Please note at this point that where components of various embodiments are numbered the same, they are substantially the same and explanation for one at times will suffice as explanation for that particular portion in the various embodiments as a matter of convenience. With the step-down hybrid of FIG. 6, the center conductor 35 of coaxial line 33 is connected through coil 37' to ground instead of being connected to a tap of the coil. The tap connection 36' of coil 37' is to the a side end of the outer sheath 48 of coaxial line 49 and to the inner conductor 50 at the b side end of coaxial line 49. It is of interest to note that with this step-down hybrid the coaxial line 49 is a transformer with the inner conductor 50 and the outer conductive sheath 48 being the transformer conductors and that, as such, the coaxial line 49 is wound on a single ferrite toroid core structure 51. In this embodiment the inner conductor at the a end is directly connected to the inner conductor of divided output coaxial line 44a and the outer sheath of the b end of coaxial line 49 is directly connected to the inner conductor of signal divided output coaxial line 44b. Here again the junctions between the coaxial line 49 and the inner conductors of coaxial line 44a and 44b are interconnected by a resistor 45.

With reference to FIG. 7, another divider embodiment is shown in the form of a T circuit that may be employed in the various feed network embodiments of the invention. This T circuit, however, does not provide isolation between output ports, or divided lines, as with the step-up hybrid of FIG. 5 or the step-down hybrid of FIG. 6 which give substantially complete divided port isolation throughout the operational frequency ranges utilized with the feed network circuits involved. In this particular feed divider T circuit the tap 36' of the impedance step-down coil 37' is connected directly to a common junction 51 with both the inner conductors of the signal divided coaxial lines 44a and 44b.

It is of interest to note with respect to these various dividers that, for example, with the step-up hybrid of FIG. 5 the difference port may be terminated either internally or externally and that this step-up hybrid may be advantageously used as a four-way divider by directly connecting the sum ports of two step-up hybrids together to the same input. With the step-down hybrid circuit of FIG. 6 the difference port is difficult to unbalance and as a consequence these hybrid circuits are hampered to some extent in having less operational bandwidth than that obtainable with step-up hybrid circuits in the various feed network embodiments. The step-down hybrids of FIG. 6 however, advantageously require only one toroid core 51 which, however, must be a larger core, at the same hybrid signal power levels, than the two cores in the step-up hybrids of FIG. 5. With respect to the T circuit of FIG. 7, no isolation is provided between the output ports of each T circuit while the hybrid circuits of FIGS. 5 and 6 advantageously provide extremely good substantially complete isolation between output ports. It should be noted further that when looking back into the output ports of a T circuit the impedance is not equal to 50 ohms, a matching impedance level employed in many of these feed networks. The T circuit, however, presents a lower loss factor than with the hybrid circuits of FIGS. 5 and 6, and further, a considerable simplification of circuitry is attained than is the case with the hybrid circuits.

In the relatively simple feed network embodiment of FIG. 8A, a signal connection 21 is connected to a divider circuit 52 having signal divided output lines 52a and 52b. The 52a line is connected to another divider circuit 53 having divided signal output lines 53a and 53b that are connected to individual array elements or CPEG elements in a horizontal billboard array via connection points 54a and 54c, respectively. The divided signal line 52b of the divider circuit 52 is connected through a $\Delta\tau$ time delay device 55 to a center element connection point 54b. This connection point is at a higher signal power level than the element connection points 54a and 54c since the signal is passed through an additional signal power division in the signal paths to the element connection points 54a and 54c than through the signal path to the antenna element connection point 54b. The time delay through the $\Delta\tau$ circuit device is substantially equal to the phase delay encountered through the signal power divider 53. The amplitude taper graph of FIG. 8B is the element current ratio graph for the embodiment of FIG. 8A just as the amplitude taper distribution graph of FIG. 3 is the corresponding current ratio graph for the embodiment of FIG. 1. In the embodiment of FIG. 8A and other embodiments of the invention step-up hybrid dividers such as shown in FIG. 5 or step-down hybrids such as shown in FIG. 6 or T divider circuits of FIG. 7 are used individually or in various combinations in various feed networks as desired, except as would be required to meet certain antenna array feed point isolation requirements. In such case the choice would probably be limited to either the step-up or step-down hybrid circuits or various combinations thereof.

The embodiment of FIG. 9A is very similar to that of FIG. 8A with the exception that the lines 53a and 53b and the line 52b through $\Delta\tau$ time delay device 55 instead of extending directly to antenna array feed points are connected respectively to the additional dividers 56, 57 and 58. The dividers 56 and 57 have, respectively, divided signal lines 56a, 56b, 57a and 57b connected to equal amplitude antenna array connection points 59a, 59b, 59e and 59f. The divided signal lines 58a and 58b of signal power divider 58 are connected respectively to antenna array connection points 59c and 59d with these two points being higher power level points according to the relative current amplitude ratios illustrated by the accompanying FIG. 9B.

In the embodiment of FIG. 10 a signal connection 21 from a symbolically indicated balun circuit 60 is the signal connection to the highest power level signal power divider 61 of a feed network 62 for a billboard antenna array of elements 23a through 23h. It is a feed network 62 that may be switchably controlled to also include connection to the connection points of additional elements 23a' at one side of the array and 23h' at the other side of the array. This provides an antenna billboard array switchable between eight active elements and ten active elements as desired for attaining desired switch selected beam characteristics. In this feed network the signal power divided lines 61a and 61b are connected, respectively, to an additional divider 63, having in turn divided signal lines 63a and 63b, and line 61b through a $\Delta_\tau$ time delay device 64 to another divider 65, having signal power divided lines 65a and 65b which are connected to feed connection points of array elements 23d and 23e. The signal divided lines 63a and 63b of signal power divider 63 are connected, respectively, to another signal power divider 66, having signal divided lines 66a and 66b, and line 63b through a $2\Delta_\tau$ delay device 67 to a signal power divider 68 having signal divided lines 68a and 68b. These divided signal lines 68a and 68b are connected, respectively, to connection points of array elements 23c and 23f. The signal divided lines 66a and 66b of signal power divider 66 are connected, respectively, to another signal power divider 69, having signal power divided lines 69a and 69b, and 66b through a $\Delta_\tau$ time delay device 70 to signal power divider 71 having signal power divided lines 71a and 71b. The signal power divided lines 71a and 71b of signal power divider 71 are connected to connection points of array elements 23b and 23g, respectively. The signal divided lines 69a and 69b of signal power divider 69 are connected, respectively, to switching devices 72a and 72b. These switching devices 72a and 72b, respectively, are each switchable to each connect one circuit 73a and 73b, respectively, including $\Delta_\tau$ time delay devices 74a and 74b, respectively, to feed points of array elements 23a and 23h. Alternatively, the switching devices 72a and 72b are switchable to additional signal power dividers 75 and 76, respectively, having divided signal output lines 75a, 75b, 76a and 76b. Please note that the signal dividers 75 and 76 divided signal output lines are connected, respectively, 75a to the connection point of array element 23a', line 75b to a portion of switch device 72a and through, when closed a circuit contact of the switch device 72a to the contact point of element 23a', and with signal power divider 76, the divided signal output line 76a is connected in like manner through the switching device 72b to the connection point of element 23h, and the signal divided line 76b is connected to the connection point of element 23h'. Please note that the switching devices 72a and 72b are such that signal feedback is blocked from the circuits switched out and that this switching capability provides the means for switching the activated-illuminated antenna array from eight to ten elements and back again to eight elements as desired.

Referring now to the embodiment of FIG. 11A of a feed network substantially the same in most respects as the feed network embodiment of FIG. 1 except that an approximately three db attenuator 77 is included in the signal divided line 28a, of signal power divider 28, to signal divider 31'. The signal divided lines 31a' and 31b', of divider 31', are connected to the outermost antenna element connection points corresponding to the connection points 23a and 23h of the FIG. 1 embodiment. Furthermore, the signal divided lines 32a' and 32b' of signal power divider 32' are connected to the next inboard array element connection points corresponding to the 23b and 23g connection points of the FIG. 1 embodiment. These changes result in a current ratio distribution graph FIG. 11B much the same as the current ratio distribution graph of FIG. 3 for the FIG. 1 embodiment except that the outermost array element amplitude ratios are reduced relative to the next inboard element ratios. This is with all the ratio values of FIG. 11B except for the outermost element ratio values being the same as with those shown in FIG. 3 for the FIG. 1 embodiment. It should be realized that while no delay device is shown in the signal divided line 28b, one may be required to compensate for any significant time delay through the 3 db attenuator 77 or the length of line 28b may be adjusted to provide delay compensation as required. It is of interest to note, with this embodiment, that the signal power removed by attenuation through the 3 db attenuator 77 is a relatively insignificant portion of the signal power at the signal connection 21, particularly after three signal power divisions and use of such circuitry may be a reasonable expedient at such reduced power levels for providing further beam shaping and sidelobe improvements.

The feed network embodiment of FIG. 12A is a natural expansion of the feed network concept set forth with respect to the embodiment of FIG. 1, however, without means providing phase beam directional control capability as provided by adjustable phase shifters 27a', 27b', etc. The network provides signal power dividing capabilities in a sequence of power dividing steps for obtaining the desired current ratio distribution through the feed network to a twelve element antenna array. In this embodiment, the signal connection 21 is connected to a first divider 24 having signal divided lines 24a and 24b, with the signal divided line 24a connected to a signal divider 25 having in turn signal divided lines 25a and 25b. The signal divided line 25a is in turn connected to signal power divider 28, also in turn having signal divided lines 28a and 28b. Here again the divided signal line 28a is connected as an input to a signal power divider 31 having signal divided lines 31a and 31b. The signal divided line 31a is in turn connected to an additional signal power divider 78 also having signal divided lines 78a and 78b that in turn are connected, respectively, to signal power dividers 79 and 80 each of which have $a$ and $b$ signal divided lines connected, respectively, to the four outermost array elements of the antenna structure. The signal divided line 31b of signal power divider 31 is connected through a $\Delta_\tau$ delay device 81 to signal power divider 82, the $a$ and $b$ arms of which are connected to the next inboard array elements $c$ and $j$, respectively, of the antenna array. The signal divided line 28b of signal power divider 28 is connected through a $2\Delta_\tau$ delay device 83 to signal power divider 84, the $a$ and $b$ arms of which are connected to the next inboard array elements $d$ and $i$, respectively, of the antenna array. The signal divided line 25b of signal power divider 25 is connected through a $3\Delta_\tau$ delay device 85 to signal power divider 86, the $a$ and $b$ arms of which are connected to the next inboard array elements $e$ and $h$, respectively, of the antenna array. The signal divided line 24b of signal power divider 24 is connected through a $4\Delta_\tau$ delay device 87 to signal power divider 88, the $a$ and $b$ arms of which are connected to the next inboard, actually the innermost, array elements $f$ and $g$, respectively, of the antenna array. The current amplitude ratio graph for the twelve array antenna embodiment of FIG. 12A is shown in FIG. 12B.

Referring now to the embodiment of FIG. 13A, the feed network includes refinements and features instrumental in obtaining a resultant twelve element antenna array current amplitude ratio graph pattern such as illustrated by the amplitude taper graph of FIG. 13B. In this embodiment the current amplitude fed to the center six elements of the array is equal and at the ratio factor of one. The next outboard elements are at a reduced relative current level of 0.707 and finally the two outermost elements at each side of the twelve element array are each fed at an equal current amplitude ratio level of 0.25. In this embodiment many of the operational dividers are numbered the same as in the embodiment of FIG. 12A, however, some of the final dividers are connected to different array connection points than is the case with the embodiment of FIG. 12A. Further, the time delay device in signal divided line 24b is a 3Δτ divider device 87'. A 3Δτ time delay device 83' is also employed in the signal divider line 25b, while a 2Δτ time delay device 81' is employed in the signal divided line 28b. One reason that the time delay device 87' is a 3Δτ time delay device the same as 83' is that an additional divider 89 is providing having signal divided lines 89a and 89b connected respectively to dividers 86 and 88, respectively. A further refinement of significance in this embodiment is provision of an additional power division step via power divider 31 with the signal divided line 31a extended to additional power divider 78 with signal divided lines 78a and 78b connected to additional dividers 79 and 80, respectively. Since only the signal divided line 31a of the divider 31 in this embodiment is connected in a signal output path of the network the problem of what is to be done with the signal energy fed to other divided arm 31b is taken care of by connection of the line 31b to a dummy load 90 useful for dissipating the signal power of the signal divided line 31b. Here again just as with the 3 db attenuator 77 of the FIG. 11A embodiment, the signal power removed via the dummy load 90 is a relatively insignificant portion of the signal power at the signal connection 21, particularly after passing through the four signal power divisions. This is one more signal power division step down than with the embodiment of FIG. 11A and at that power db level down the use of such a dummy load is a reasonable expedient in providing further beam shaping and sidelobe improvement.

The following table illustrates differences in circuit requirements between some of the feed network embodiments and the corresponding various antenna beam operational results obtained.

| Embodiment Fig. No. | Output ports | Branches requiring delay compensation | No. of hybrids required | 1st sidelobe level, db | 2nd sidelobe level, db |
|---|---|---|---|---|---|
| 8A | Three | One | Two | −15 | −17.4 |
| 9A | Six | do | Five | −15 | −17.4 |
| 1 | Eight | Two | Seven | −26 | −20 |
| 11A | do | Three | do | −28 | −22 |
| 12A | Twelve | Four | Eleven | −20 | −28 |
| 13A | do | Three | Twelve | −20.4 | −30.4 |

Whereas this invention is here illustrated and described with respect to specific embodiments thereof, it should be realized that various changes may be made without departing from the essential contributions to the art made by the teachings hereof.

I claim:

1. In an amplitude tapering nonsymmetrical binary feed network for phased arrays, a plurality of signal power dividers each having equal power division, respectively, from a single connection on one side to two divided signal connections toward the antenna array side; with one of the two divided signal connections toward the antenna array side of a divider being connected to the input of another signal power divider; with at least two antenna array elements connected through at least one more signal power divider in the feed network than a third antenna array element; wherein time delay means is inserted in signal path means from the one of two divided signal connections, of a signal divider, that is passed through fewer power division steps than the other of the two divided signal connections, of the same signal divider; with the delay of said time delay means being substantially equal to the additional phase delay in the signal paths through the one of the two divided signal connections having more power division steps; said feed network is connected to feed a plurality of antenna array element connection points; and including signal phase adjusting devices in respective signal path means of the feed network connected to each of said antenna array element connection points.

2. The amplitude tapering nonsymmetrical binary feed network for phased arrays of claim 1, wherein the feed network employs a plurality of signal dividers so connected in the feed network as to present multiple signal paths with varying numbers of power division steps; and with a plurality of the signal paths including at least one of said time delay means.

3. The amplitude tapering nonsymmetrical binary feed network for phased arrays of claim 2, wherein the delay of at least two of said time delay means is materially different.

4. The amplitude tapering nonsymmetrical binary feed network for phased arrays of claim 1, wherein at least one of the plurality of signal power dividers is a T circuit.

5. The amplitude tapering nonsymmetrical binary feed network for phased arrays of claim 1, wherein at least one of the plurality of signal power dividers is a hybrid circuit providing substantially complete isolation to reflected signals at each of the two divided signal connections.

6. The amplitude tapering nonsymmetrical binary feed network for phased arrays of claim 5, wherein said hybrid circuit is a step-up hybrid circuit.

7. The amplitude tapering nonsymmetrical binary feed network for phased arrays of claim 5, wherein said hybrid circuit is a step-down hybrid circuit.

References Cited

UNITED STATES PATENTS

| 2,418,124 | 4/1947 | Kandoian | 343—854 |
| 3,085,204 | 4/1963 | Sletten | 343—777 |
| 3,255,450 | 6/1966 | Butler | 343—854 |
| 3,258,774 | 6/1966 | Kinsey | 343—854 |
| 3,325,816 | 6/1967 | Dutton | 343—777 |

HERMAN K. SAALBACH, Primary Examiner

T. VEZEAU, Assistant Examiner

U.S. Cl. X.R.

343—854